United States Patent [19]

Nakamura et al.

[11] Patent Number: 4,653,762
[45] Date of Patent: Mar. 31, 1987

[54] FUEL TANK AND FUEL FEED SYSTEM FOR A MOTORCYCLE

[75] Inventors: Michio Nakamura, Niiza; Minoru Tsunoda, Asaka; Hiroshi Murakami; Yuuji Matsui, both of Shiki; Noriyasu Matsuhashi, Sakado; Kiyoshi Fukuchi, Tokorozawa, all of Japan

[73] Assignee: Honda Giken Kogyo Kabushiki Kaisha, Tokyo, Japan

[21] Appl. No.: 806,899

[22] Filed: Dec. 9, 1985

[30] Foreign Application Priority Data

Dec. 27, 1984 [JP] Japan .................. 59-275195
Dec. 27, 1984 [JP] Japan .................. 59-199579[U]
Dec. 27, 1984 [JP] Japan .................. 59-199580[U]

[51] Int. Cl.⁴ ............................................. B62J 35/00
[52] U.S. Cl. .................................. 280/5 A; 180/219; 123/495
[58] Field of Search .................. 280/5 A, 5 H, 202; 180/219; 123/495, 505

[56] References Cited

U.S. PATENT DOCUMENTS

4,124,008 11/1978 Fujikawa ........................... 123/495
4,311,261 1/1982 Anderson et al. ................. 280/5 A
4,469,190 9/1984 Yamaguchi ....................... 280/5 A

Primary Examiner—John J. Love
Assistant Examiner—Donn McGiehan
Attorney, Agent, or Firm—Armstrong, Nikaido, Marmelstein & Kubovcik

[57] ABSTRACT

A motorcycle is provided with first and a second fuel tanks. These tanks are provided with fuel charging ports respectively. Both the fuel tanks are intercommunicated through a communicating pipe. Since the communicating pipe can be shut by a cock, fuel can be charged into both the tanks promptly through both the fuel charging ports. The communicating pipe is provided with a fuel pump actuated by a diaphragm communicated with an intake manifold of an engine. Accordingly, even if one of the fuel tanks is disposed at a location lower than the carburetor, fuel within the fuel tank can be fed to the carburetor via the other fuel tank. The first and the second fuel tanks may be combined to constitute a single fuel tank.

7 Claims, 10 Drawing Figures

FUEL TANK AND FUEL FEED SYSTEM FOR A MOTORCYCLE

BACKGROUND OF THE INVENTION

This invention relates to a motorcycle, and more particularly to a fuel tank and a fuel feed system thereof.

In a motorcycle, a fuel tank is usually disposed on a main pipe at an upper location of an engine, therefore the tank is disposed higher than a carburetor. Accordingly, fuel is fed from the fuel tank to a float chamber of the carburetor by a natural downward flow due to its own weight. In such a motorcycle as just mentioned, when capacity of the fuel tank is to be greatly increased either the tanks width is made wider or the tanks height is made larger. The reason is that the length is limited within a certain range.

However, if the width of the fuel tank is widened, a rider will find it difficult to ride on the motorcycle. Moreover, since a full fuel tanks weight is increased in ratio with respect to the vehicle body weight, the center of gravity of the whole vehicle is. Furthermore, since the liquid surface within the fuel tank increases, the liquid surface is fluctuated largely due to the jolting of the vehicle body which causes the fuel feed quantity to the carburetor to change.

When the height of the fuel tank is increases, a bottom portion of the tank will be lower than the position where the carburetor is located. Accordingly, an additional fuel pump must be installed in order to effectively consume the fuel within the fuel tank. However, addition of such a fuel tank invites an increase in weight of the vehicle body as well as an increase in cost.

SUMMARY OF THE INVENTION

It is therefore a first object of the present invention to provide a motorcycle which is equipped with a large capacity fuel tank without widening the width and without increasing the height of the center of gravity of the vehicle body.

Another object of the invention is to provide a motorcycle, wherein fuel can be rapidly fed to a fuel tank.

A further object of the invention is to provide a motorcycle, wherein fuel can be fed to a carburetor from a fuel tank portion which is located lower than the carburetor.

A still further object of the invention is to provide a motorcycle which is equipped with a simple and inexpensive fuel pump.

A motorcycle according to the present invention includes a first fuel tank disposed at an upper portion of a vehicle body and having a fuel charging port, a second fuel tank disposed at a location lower than the first fuel tank and having a fuel charging port, a communicating pipe for intercommunicating both the first and the second tanks, and a switching means inserted into the communicating pipe and adapted to open and shut the communicating pipe. In the present invention, since there is a second fuel tank serving as a sub-tank besides a first fuel tank serving as a main tank, a large quantity of fuel can be stored. In addition, since these fuel tanks are disposed in superposed relation with respect to each other, it is not required to widen the width in order to increase the capacity, nor to increase the height of the center of gravity of a vehicle body. Moreover, since both the first and the second fuel tanks are provided with fuel charging ports respectively, fuel can be fed to both the fuel tanks simultaneously, thus ensuring prompt feeding of fuel. Also, fuel can be fed to one fuel tank from the other fuel tank.

According to another feature of the present invention, a fuel reservoir portion is defined at a position higher than a carburetor within the first fuel tank, and the second fuel tank communicates with the fuel reservoir portion through a communicating pipe and a fuel pump. Accordingly, even if the second fuel tank is located at a position lower than the carburetor, fuel can be fed to the carburetor through the fuel reservoir portion. The first and the second fuel tanks may be combined to form one fuel tank.

According to an additional feature of the present invention, a pump which is actuated by a diaphragm communicating with an intake manifold of an engine is used in order to upwardly feed the fuel to the carburetor from a fuel tank disposed at a location below the carburetor. This pump is extremely simple in its structure and is inexpensive.

DESCRIPTION OF THE PREFERRED EMBODIMENT

A preferred embodiment of the present invention will be described hereunder with reference to the accompanying drawings.

Figure 1:
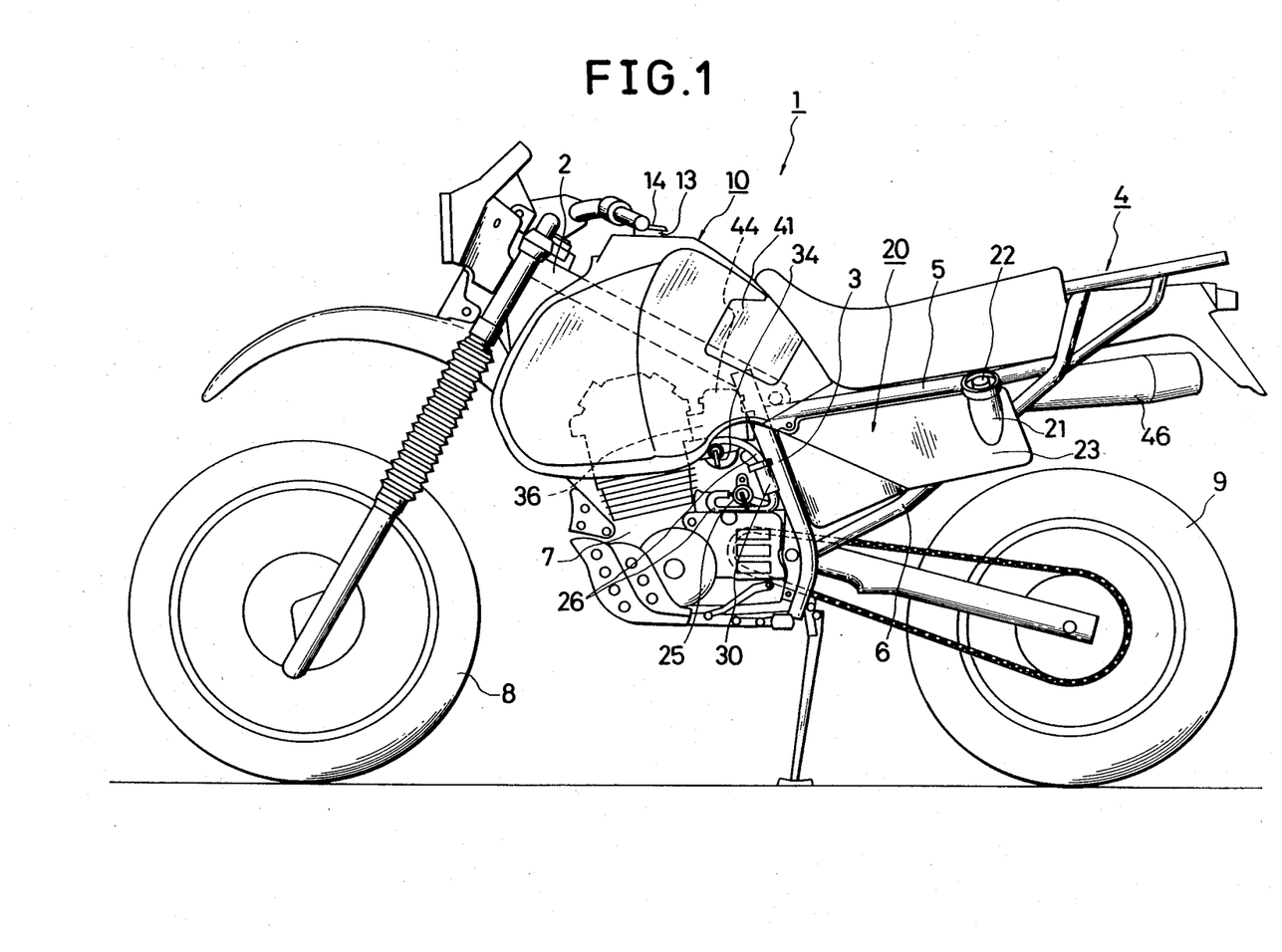
FIG. 1 is a side view of a motorcycle according to the present invention.
Figure 5:
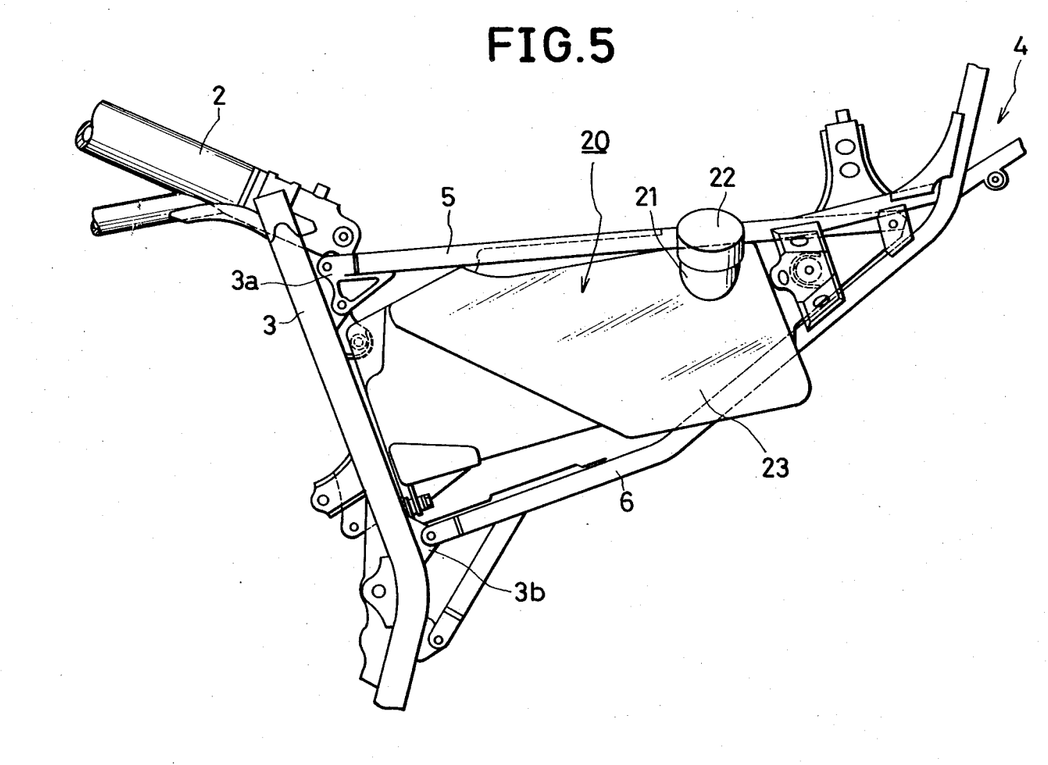
FIG. 5 is a side view showing the sub-fuel tank together with a sub-frame.

FIG. 1 is a side view showing a whole picture of a motorcycle 1 to which the present invention is applied. The motorcycle according to this embodiment is for running on unleveled ground. A main frame 2 is connected at its rear end portion with a pair of right and left center pillars 3. The center pillars 3 are connected with a sub-frame 4. The sub-frame, as shown in FIG. 5, comprises a seat rail 5 and a back stay 6 bifurcated from the back toward the front respectively. A front end of the seat rail 5 and a front end of the back stay 6 are detachably attached to brackets 3a and 3b provided at an upper portion and a lower portion of the center pillar 3, respectively, by bolts (not shown), etc. An engine 7 is supported by the center pillar 3 between a front wheel 8 and a rear wheel 9.

Figure 2:
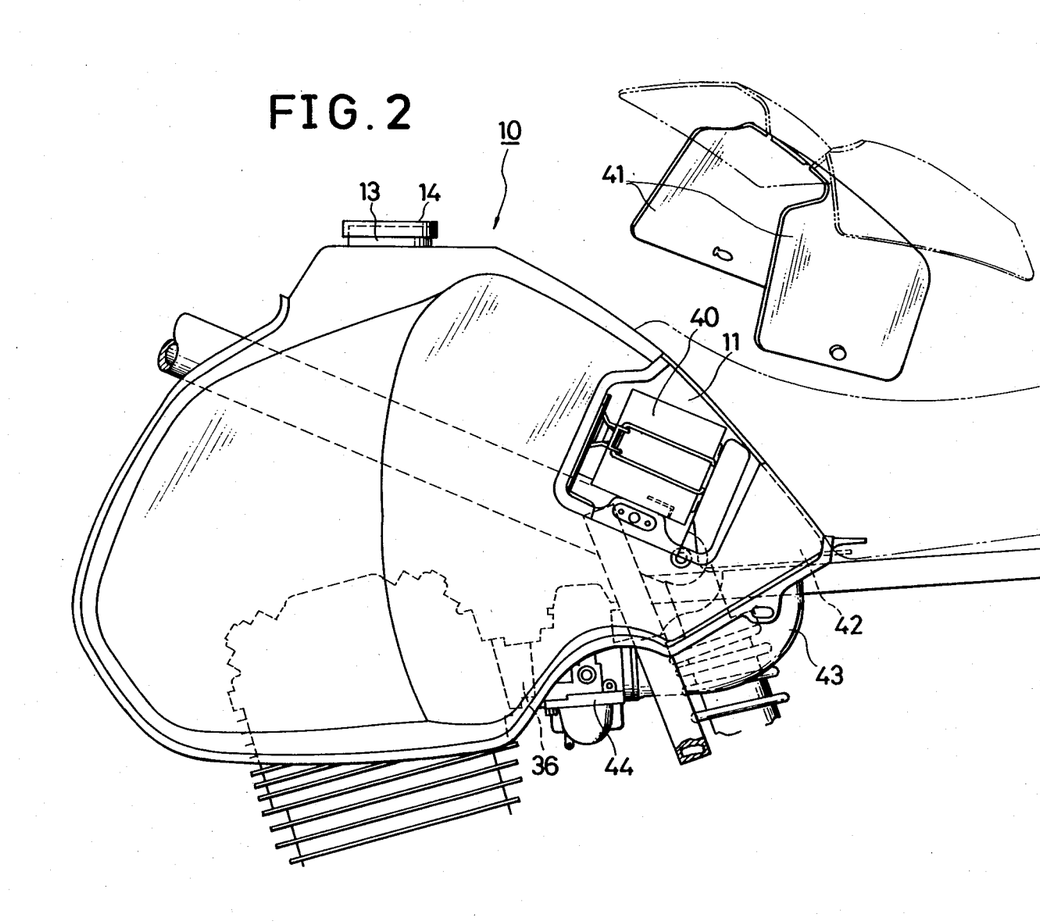
FIG. 2 is an enlarged side view of a main fuel tank in the motorcycle.

A main fuel tank 10 (first fuel tank) large enough to cover a sideward head portion of the engine 7 and formed in a generally U-shape section is disposed straddling the main frame 2. The main fuel tank 10 is formed at its rear and upper portion with an open space 11 as shown in FIG. 2. Within the space 11, an air cleaner element 40 is arranged. The space 11 is covered with a detachable cover 41. The air cleaner element 40 communicates with an air chamber 42 disposed therebehind. The air chamber 42 is connected to a carburetor 44 through a communicating pipe 43. Air filtered by the air cleaner element 40 is fed to the carburetor 44 from the air chamber 42 through the communicating pipe 43.

Figure 3:
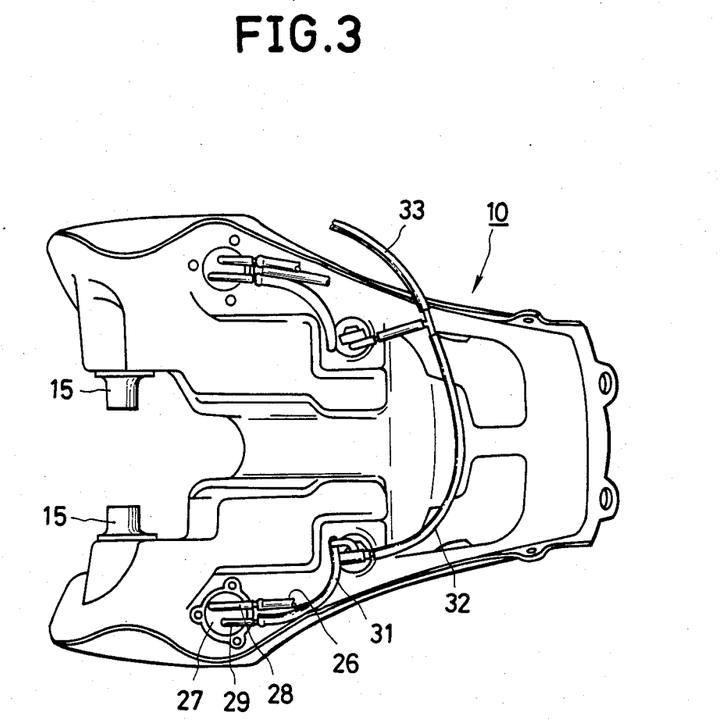
FIG. 3 is a bottom view thereof.
Figure 4:
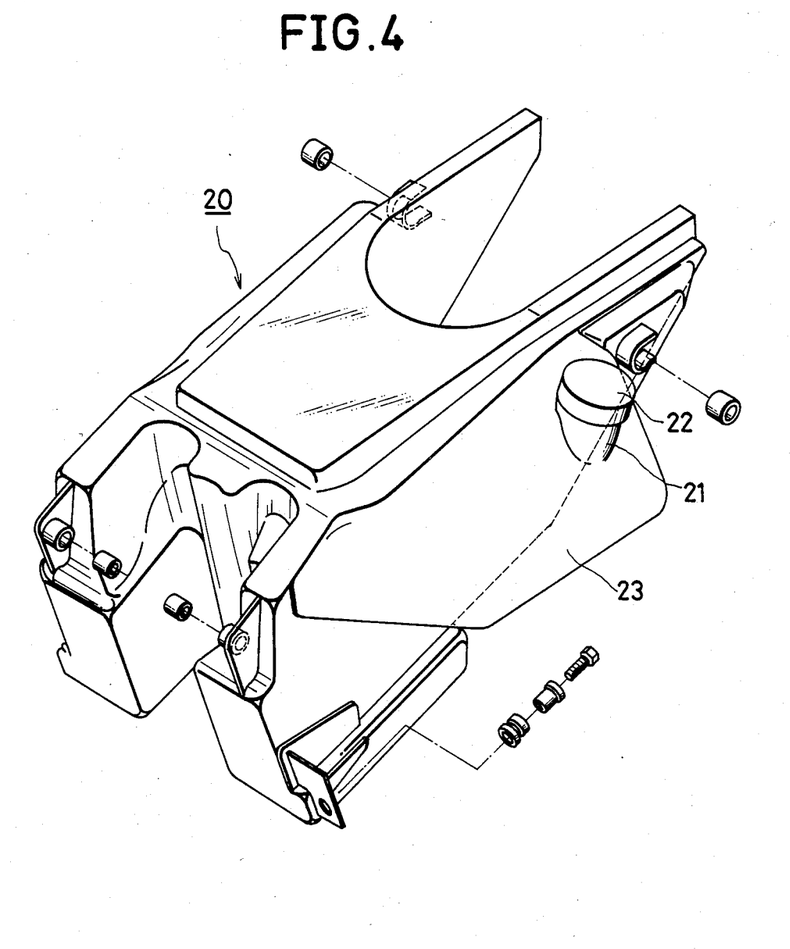
FIG. 4 is an enlarged perspective view of a sub-fuel tank in the motorcycle.

The main fuel tank 10 is provided at its top portion with a fuel charging port 13, to which a fuel cap is detachably engaged. The main fuel tank 10 is integrally mounted with a vehicle body frame in such a manner as to engage a pair of right and left retaining projections 15 (FIG. 3) projecting from its front portion with a pair of right and left U-shaped supporting pieces (not shown) at the vehicle body side, and fixing its rear end to the sub-frame 4 by screws, etc.

The motorcycle 1 is also provided with a sub-fuel tank 20 (second fuel tank) besides the main fuel tank 10 (first fuel tank), so that the motorcycle 1 can be kept running without refueling for a long time. The sub-fuel tank 20 is disposed at a triangle-shaped portion formed by the seat rail 5, back stay 6 and center pillar 3, and located below the carburetor 44. The sub-fuel tank 20 is provided at both sides with extended portions 23 extending sidewardly over the back stay 6. The left side extended portion is provided at its rear portion with the fuel charging port 21. The fuel charging port 21 has a removable fuel cap 22.

Figure 6:
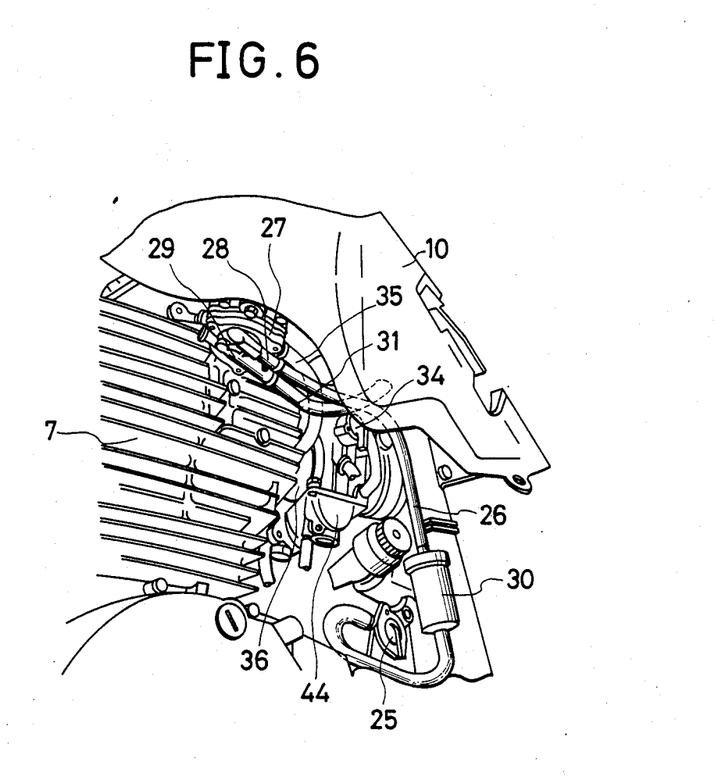
FIG. 6 is a partly enlarged perspective view of the motorcycle.
Figure 7:
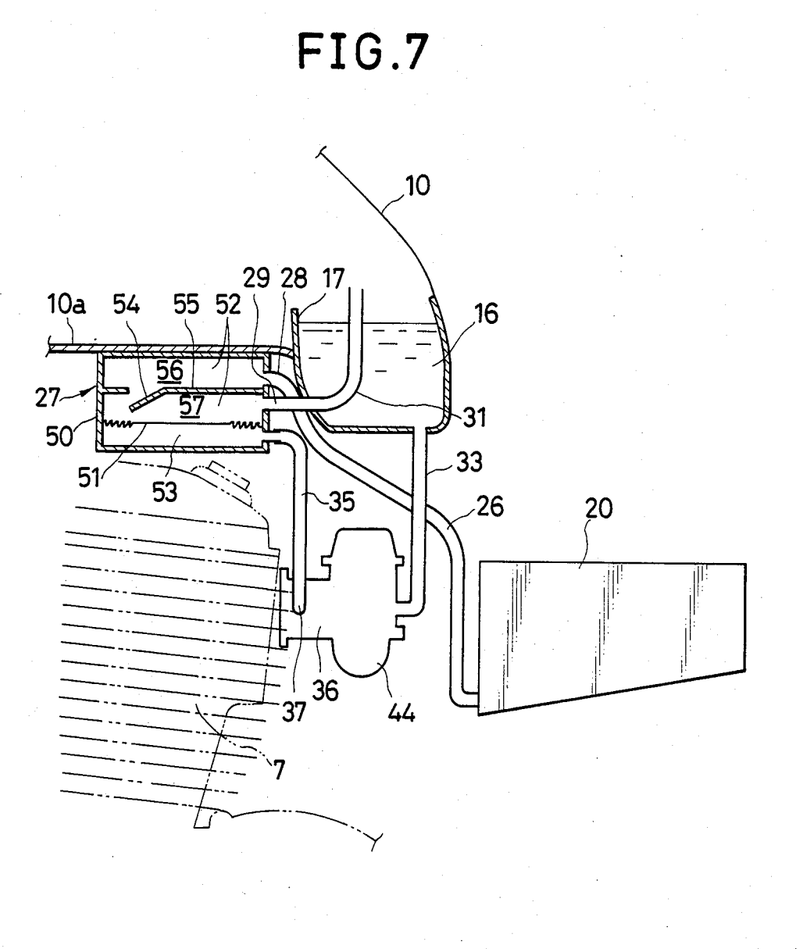
FIG. 7 is a schematic view for explaining the fuel feed system of the motorcycle.

The sub-fuel tank 20 is provided at its front and lower portion with a cock 25 which communicates with the inside of the tank 20 as shown in FIGS. 1 and 6. The cock 25 is connected to the fuel intake port 28 of the fuel pump 27 attached to a bottom surface of the main fuel tank 10 through the communicating pipe 26. The fuel tank discharging port 29 of the fuel pump 27 is communicated with the main fuel tank 10 through the communicating pipe 31. Fuel within the sub-fuel tank 20 is fed to the main fuel tank 10 by actuation of the fuel pump 27. Numeral 30 denotes a filter inserted into the communicating pipe 26. The fuel pump 27 is formed with a pump chamber 52 and a diaphragm chamber 53 defined by a diaphragm 51 within a casing 50 as schematically shown in FIG. 7. The pump chamber 52 is separated into an intake portion 56 and a discharge portion 57 by a partition wall 55 including a valve 54. The intake portion 56 is connected to the fuel intake port 28, and the discharging portion 57 is connected to the fuel discharging port 29. On the other hand, the diaphragm chamber 53 is communicated with an intake manifold 36 of the engine 7 through a pressure intake pipe 35.

When the engine 7 is actuated, pressure (negative pressure) within the intake manifold 36 fluctuates according to stroke of the piston. This pressure change is transmitted to the diaphragm chamber 53 through the pressure intake pipe 35, and volume of the pump chamber 52 is changed according to up and down movement of the diaphragm. In accordance with the foregoing, a valve 54 is opened and shut, and fuel within the sub-fuel tank 20 enters the pump chamber 52 through the communicating pipe 26 when the diaphragm 51 is moved downwardly. When the diaphragm 51 is moved upwardly, fuel within the discharging portion 57 is discharged into the main fuel tank 10 through the communicating pipe 31. The communicating pipes 26 and 31 are provided with a check valve for preventing a back flow of the fuel as the occasion may demand. Since the fuel pump 27 is mounted to an under surface of a bottom portion 10a of the main fuel tank 10, the diaphragm chamber 53 is located in a position higher than a connection portion between the pressure intake pipe 35 and an intake manifold 36, i.e., a negative pressure take off portion 37. Accordingly, even if unevaporated fuel in a liquid state is mixed within the intake manifold 36, the liquid-state fuel will never climb up within the pipe 35 to reach the diaphragm chamber 53. Accordingly, the diaphragm 51 is always stably actuated and renders a predetermined satisfactory performance.

A right side bottom portion and a left side bottom portion of the main fuel tank 10 are intercommunicated through the communicating pipe 32, and connected to the carburetor 44 through the fuel feed pipe 33. The fuel feed pipe 33 is provided with the cock 34. When the cock 34 is opened, the fuel is fed to the carburetor 44 from the main fuel tank 10 due to difference of the height between the main fuel tank 10 and the carburetor 44. A muffler 46 connected to an exhaust port (not shown) of the engine 7 is disposed at the right side of the vehicle body.

With the constitution of the present invention as set forth above, when the cock 34 is opened, the fuel within the main fuel tank 10 is fed to the carburetor 44 through the fuel feed pipe 33 and the cock 34 due to the height difference.

When the cock 25 is opened and the engine 7 starts working, the fuel pump 27 is actuated to feed the fuel within the sub-fuel tank 20 into the main fuel tank 10 through the cock 25, communicating pipe 26, fuel pump 27 and communicating pipe 31.

Since the main fuel tank 10 and the sub-fuel tank 20 are provided with a fuel charging port 13 and the fuel charging port 21 respectively, the fuel can be simultaneously feed to the main fuel tank 10 and the sub-fuel tank 20. Accordingly, time for refueling can be shortened.

Since the sub-fuel tank 20 is disposed below the main fuel tank 10, the center of gravity of the vehicle body is lower than a conventional motorcycle, wherein a fuel tank is disposed astraddling over a main frame. At the same time, loading quantity of fuel can be increased.

Since the respective fuel tanks 10 and 20 are provided with the fuel charging ports 13 and 21 respectively, even if the fuel pump 27 happens to be out of order, the fuel can be siphoned off from the sub-fuel tank 20 by inserting a portable fuel pump into the fuel charging port 21 of the sub-fuel tank 20 to feed into the main fuel tank 10.

Since the fuel charging port 21 of the sub-fuel tank 20 is disposed to the left side and the muffler 46 is disposed to the right side, layout of the muffler 46 can be freely changed without being disturbed by the fuel charging port 21.

Since the fuel pump 27 is driven by pressure fluctuation of the intake manifold 36, a drive system of the pump is formed simply by connecting the intake manifold 36 to the pump 27 through the pressure intake pipe 35. Accordingly, fuel within a fuel tank disposed at a lower location can be fed to a carburetor disposed at an upper location by a simple apparatus. In addition, a stable pumping operation can be obtained.

Figure 8:
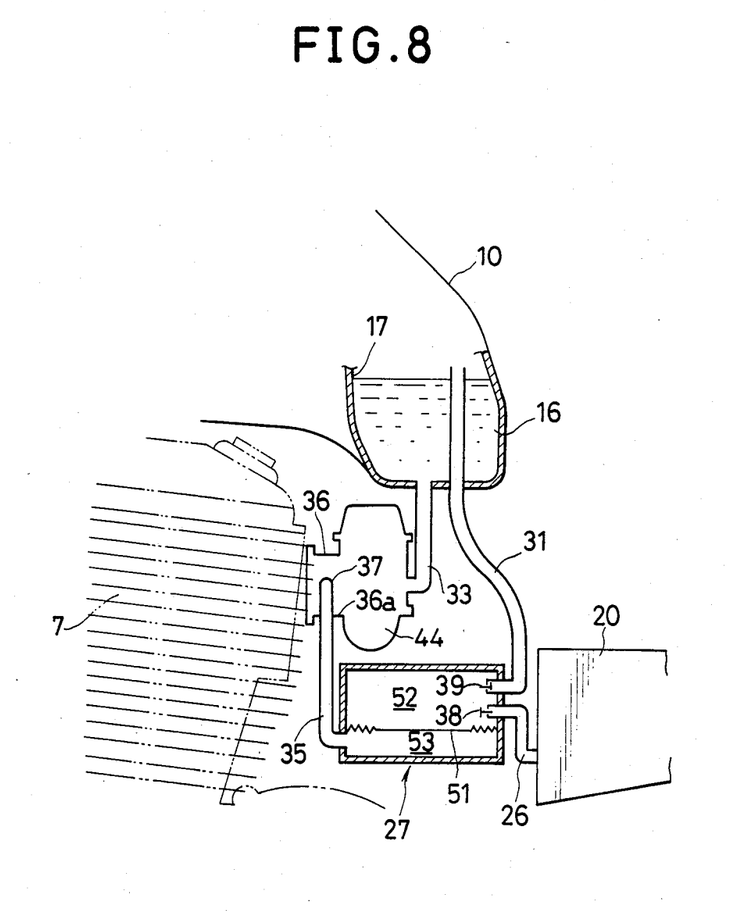
FIG. 8 is a schematic view similar to FIG. 7 for explaining another embodiment.

In the above mentioned embodiment, the fuel pump 27 is disposed at the bottom surface of the main fuel tank 10, i.e., a position higher than the intake manifold 36, in order to prevent the liquid fuel within the intake manifold 36 from entering into the diaphragm chamber 53. Alternatively, the pump 27 may be disposed at a lower desired height with the same result that the liquid fuel is prevented from entering into the diaphragm chamber 53. FIG. 8 is a schematic view similar to FIG. 7 showing such an embodiment as just described. In this embodiment, the pump 27 is disposed at a location lower than the intake manifold 36 by being mounted to, for example, the sub-fuel tank 20. However, the negative pressure take-off portion 37, where the pressure intake pipe 35 communicates with the diaphragm chamber 53, which operates off a negative pressure from the intake manifold 36, is disposed at a location sufficiently separated upwardly from a lowest portion 36a of the intake manifold 36. Accordingly, the liquid fuel residing in the lower portion of the intake manifold 36 will never enter into the diaphragm chamber 53 via the pressure intake pipe 35. In the pump 27 of this embodiment, instead of a provision of the partition wall 55 and the valve 54 as shown in FIG. 7 in the pump chamber 52, the communicating pipes 26 and 31 are provided with the intake valve 38 and the discharge valve 39 respectively.

Figure 9:
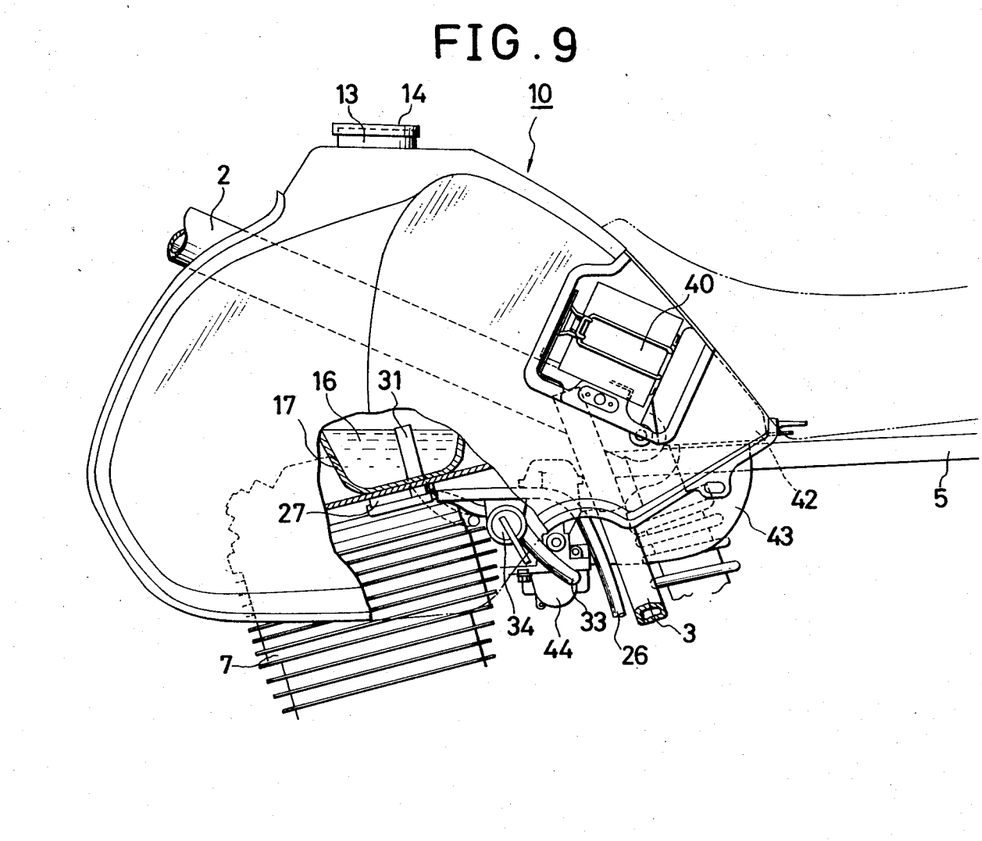
FIG. 9 is a side view, partial section, showing a main fuel tank in another embodiment.

In FIGS. 7 and 8, 16 denotes a fuel reservoir portion formed by being partitioned by the partition wall 17 within the main fuel tank 10. The fuel reservoir portion 16 may be provided at either the right or left side of the intermediate portion within the main fuel tank 10 as shown in FIG. 9. In any case, the fuel reservoir portion 16 is disposed at a location higher than the carburetor 44 within the main fuel tank. And, the fuel fed from the sub-fuel tank 20 by the fuel pump 27 is reserved in the fuel reservoir portion 16, and fed to the carburetor 44 therefrom in the same manner as described. The fuel reserved at a location lower than the fuel reservoir portion 16 of the main fuel tank 10 flows into the fuel reservoir portion 16 due to the flow of the fluid within the tank 10 caused by acceleration and deceleration of the vehicle body, etc. Alternatively, an additional pump may be employed for this purpose.

With the fuel reservoir portion 16 as described, the following advantages can be obtained. When fuel happens to overflow from a float chamber, due to swinging, inclining, etc. of the vehicle body during the running of the motorcycle which consumes the fuel from the sub-fuel tank 20 after the fuel within the main fuel tank is emptied, fuel must be immediately fed to the float chamber. In this case, since the fuel reserved in the fuel reservoir portion 16 can be immediately fed to supplement the fuel the float chamber without being limited to the discharge quantity of the fuel pump 27. Therefore, there will not be a temporary shortage of fuel within the carburetor 44 and thus the engine 7 will run normally. Accordingly, the fuel pump need not be made larger in order to avoid a temporary shortage of fuel due to an overflow of the carburetor.

Figure 10:
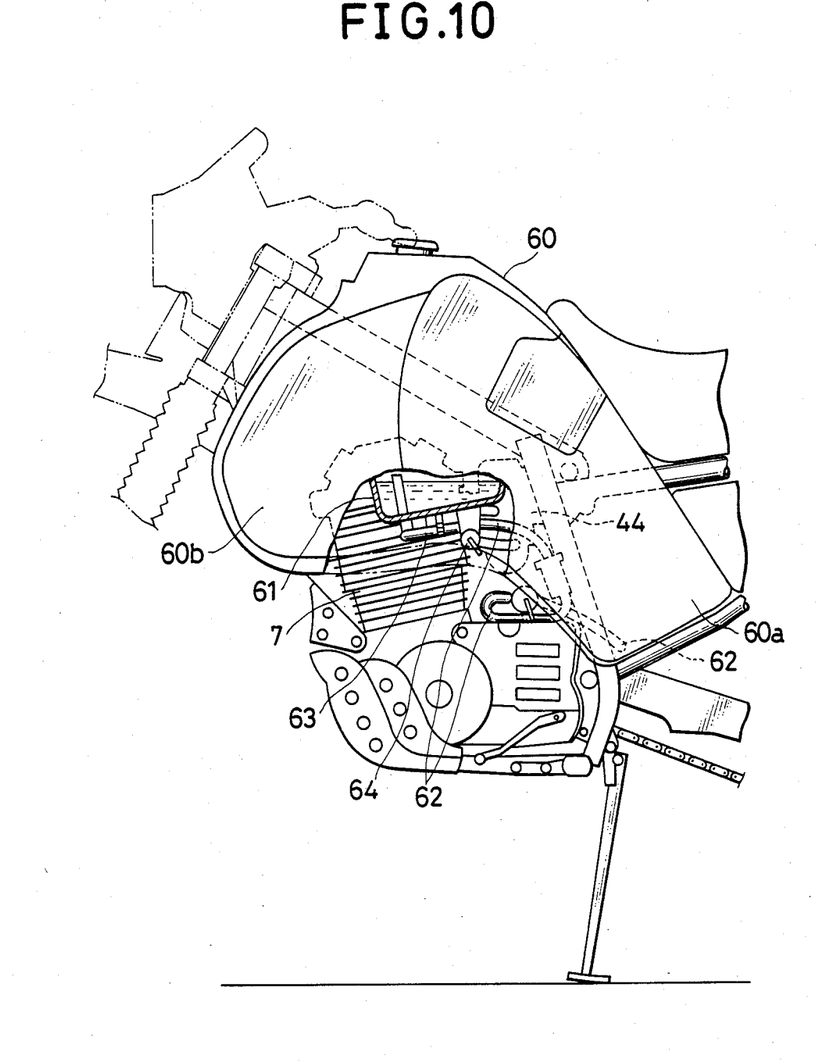
FIG. 10 is a side view, partial in section, showing a fuel tank in a further embodiment.

FIG. 10 illustrates a further embodiment of the present invention. In this embodiment, the main fuel tank 10 and the sub-fuel tank 20 are combined to form a fuel tank 60. Accordingly, a rear and lower portion 60a of the fuel tank 60 is disposed lowered than the carburetor 44. And, a fuel reservoir portion 61 similar to the preceding embodiment is disposed within a front and upper portion 60b of the fuel tank 60. Fuel is fed to the fuel reservoir portion 61 from the lower portion 60a through a communicating pipe 62 and a fuel pump 63. The fuel within the fuel reservoir portion 61 is fed to the carburetor 44 via a cock 64.

What is claimed is:

1. A motorcycle comprising:
a first fuel tank disposed at an upper portion of a vehicle body and having a fuel charging port, a second fuel tank disposed at a location lower than said first fuel tank and having a fuel charging port, a communicating pipe for intercommunicating both said first and said second tanks, means for fuel transfer from said second fuel tank to said first fuel tank through said communicating pipe, and switching means inserted into said communicating pipe for opening and shutting the communicating pipe.

2. A motorcycle according to claim 1, wherein said first fuel tank is disposed astraddling over a main frame of the vehicle body, and said second fuel tank is disposed below a rear portion of said first fuel tank.

3. A motorcycle according to claim 1 or 2, wherein said means for fuel transfer is a pump which is actuated by a diaphragm communicated with an intake manifold of an engine.

4. A motorcycle according to claim 1 or 2, wherein a fuel reservoir portion is defined at a location higher than a carburetor within said first fuel tank, said fuel reservoir portion being connected to a carburetor through a fuel cock, said communicating pipe being connected to said fuel reservoir portion through a fuel pump.

5. A motorcycle according to claim 4, wherein said fuel pump is actuated by a diaphragm communicated with a intake manifold of the engine.

6. A motorcycle comprising:
a fuel tank, an upper tank portion of said fuel tank is disposed at a location higher than a carburetor and a lower tank portion of said fuel tank is disposed at a location lower than said carburetor, said upper tank portion of said fuel tank being provided internally with a fuel reservoir portion connected to said carburetor through a fuel cock, said fuel reservoir portion and said lower tank portion being interconnected through a communicating pipe and a fuel pump, said fuel pump for pumping fuel from said lower tank portion to said upper tank portion through said communicating pipe.

7. A motorcycle according to claim 6, wherein said fuel pump is actuated by a diaphragm communicated with an intake manifold of an engine.

* * * * *